C. LAMB & T. J. FRAZIER.
Machines for Trimming Lumber.

No. 138,505. Patented May 6, 1873.

ATTEST:
H. F. Eberts
H. S. Sprague

INVENTOR:
Chauncy Lamb
Thos. J. Frazier
By Atty.
Thos. S. Sprague

UNITED STATES PATENT OFFICE.

CHANCY LAMB AND THOMAS J. FRAZIER, OF CLINTON, IOWA.

IMPROVEMENT IN MACHINES FOR TRIMMING LUMBER.

Specification forming part of Letters Patent No. 138,505, dated May 6, 1873; application filed September 30, 1872.

*To all whom it may concern:*

Be it known that we, CHANCY LAMB and THOMAS J. FRAZIER, of Clinton, in the county of Clinton and State of Iowa, have invented a new and useful Improvement in Machines for Trimming Lumber; and we do declare that the following is a true and accurate description thereof, reference being had to the accompanying drawing and to the letters of reference marked thereon and being a part of this specification, in which—

Figure 1:
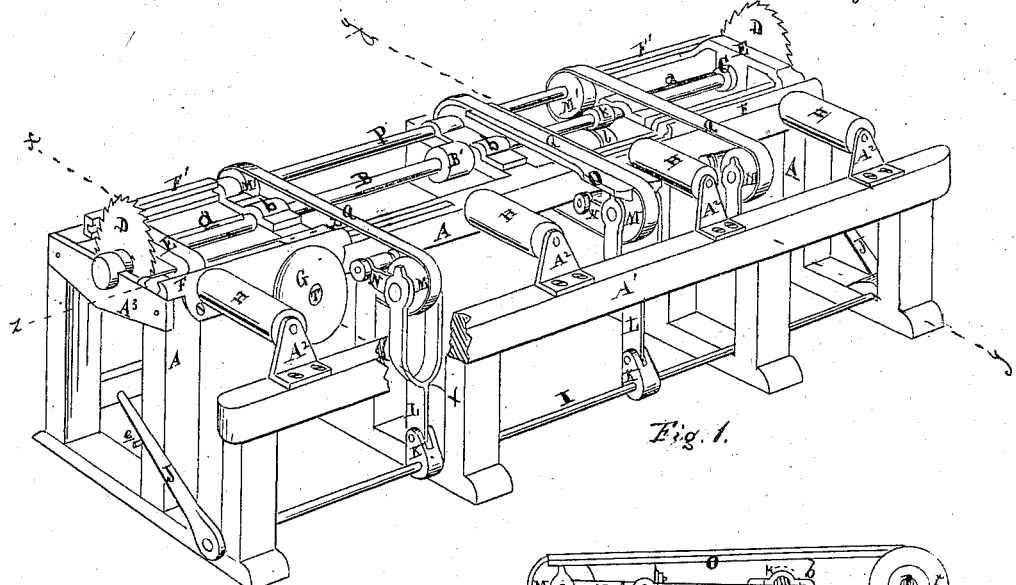
Figure 2:
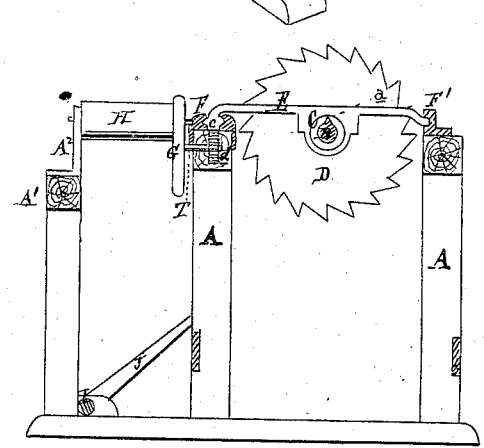
Figure 3:
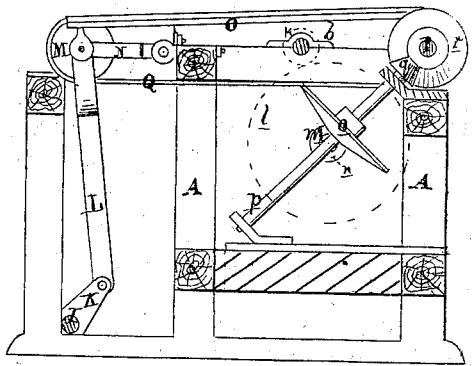
Figures 4, 5:
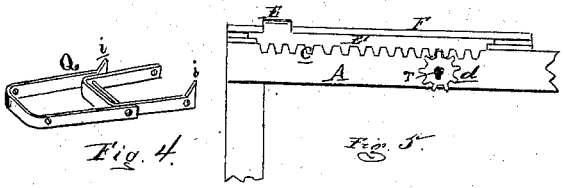

Figure 1 is a perspective view of our improved machine. Fig. 2 is a cross-section at $x\ x$, Fig. 1. Fig. 3 is a cross-section at $y\ y$; and Fig. 4 is a perspective view of a short section of the carrier-chain. Fig. 5 is a longitudinal section of a guide, F, at $z\ z$, Fig. 1.

Like letter refer to like parts in each figure.

The nature of this invention relates to a machine to be used in saw-mills for the purpose of trimming the ends of boards as they are sawn, making the lumber of uniform length, and, by shifting one or both saws on the mandrel, to cut off defective parts of the board near the ends thereof, and thus make the shortened board pass for sound lumber instead of "cull." By adding one or more stationary saws to the arbor the machine can be used for cross-cutting boards into box material with great celerity. The invention consists in a long frame having a saw-arbor longitudinally journaled therein, with a circular saw, collar, and yoke sliding on it at each end, each saw being moved on the arbor, by a hand-wheel, rack, and pinion. The extent of the movement of each saw being four feet and the length of the arbor twenty feet, it follows that boards may be trimmed to any length between twelve and twenty feet.

In the drawing, A represents a frame of timber-work put together, as shown, and about twenty feet in length. B is a shaft or arbor journaled in boxes B on top of the main frame. At each end of the shaft there is a feather, $a$. A pulley, B′, is secured on the shaft or arbor, so that it may be rotated by a belt from a shaft below the mill-floor. C is a collar sliding on the feather at each end of the shaft, and carries also a circular saw, D. E is a yoke which slides in guides F F′ at each end of the frame, across which it reaches. It also embraces an annular feather on the collar, so that as the yoke is moved longitudinally in its guides it will carry the collar and saw with it, the saw being continually rotated by the arbor. The end of each yoke nearest the front side of the machine has cast with it, at a right angle with the body, a rack-bar, E′, having a toothed rack, $c$, on the under face. With this rack a pinion, $d$, on a short shaft, T, engages, said shaft being journaled in the front upper stringer of the main frame, and is provided with a hand-wheel, G, by which it may be rotated and thus move the saw on the arbor. H are rollers whose inner ends are journaled in the front stringer of the main frame A, while their outer ends are journaled in standards $A^2$ rising from a lower part, $A^1$, of and in front of the main frame. On these rollers the board is moved lengthwise of the machine, and the saws are adjusted to square its ends by the hand-wheels, only one of which is ordinarily used, except when a defective end of the board is to be cut off.

The board could now be pushed back by the two men who tend the machine and be trimmed by the saws, the yokes E E supporting the ends of the board while being cut, but this would involve the expenditure of much muscular force and a waste of time.

To overcome these difficulties we provide for the automatic feeding up of the board to the saws in the following manner, which constitutes the second part of our invention: In the lower front angle of the frame A′ we journal a rock-shaft, I, with a lever, J, at each end, said lever being supported in an inclined position by a pin, $e$. On the shaft I several rocker-arms, K, are secured, to each of which is pivoted the lower end of a forked connecting-rod, L, in whose jaws is pivoted a pulley, M. The shaft of the pulley M is also journaled in the fork of a radius-link, N, which is pivoted to the front of the main frame. O is a wooden guide-rod, its front end resting on projections at the upper extremities of the forked rod L and is slotted to allow the pulley to revolve freely. The back end of the guide-rod, extending nearly to the back of the main frame, is pivoted thereto. By throwing up either of the levers J all the pulleys M and guide-rods O will be slightly raised so as to bring them above the plane of the rollers H. P is a shaft journaled along the back edge of the main frame, and carries the pulleys M', one opposite each pulley M. Around these pulleys run the endless chains Q, the upper limb of each running in a groove in the guide-rod which supports it. The construction of these chains is peculiar. The links are bent to a U-shape nearly from flat bars set upon edge, with the jaws of one link embracing and pivoted to the base of the next. One end of each link-bar has formed on it an upward-projecting spur, $i$, and these spurs are alternately placed in the chain so as to present a spur with every second link at each side of the chain. It is evident, therefore, that if the shaft P is rotated so as to carry the chains toward the back of the frame, that while the chains are below the plane of the rollers H, the lumber may be run back and forth on the latter, but, by lifting the lever J at either end, the pulleys M will be raised, and with them the guide-rods and chains. The spurs of the latter, taking hold of the under face of the board, will carry the latter bodily past the saws, which will trim the ends and finally discharge the lumber at the back of the machine.

The rotation of the shaft P may be effected in several ways, but we prefer the following: On the saw-arbor we key a friction-pulley, $k$, which gives motion to a larger pulley, $l$, on a shaft, $m$, journaled below. On the end of this shaft is a bevel friction-wheel, $n$, which gives motion to a larger friction-wheel, $o$, keyed to an inclined shaft, $p$, transversely journaled in the frame. At the anterior end of the shaft $p$ a bevel friction-wheel, $q$, is keyed, which rotates the shaft P through a friction-pinion, $r$, as shown. The feeding up of the lumber is thus effected without expenditure of muscular labor beyond moving one of the levers J, and the feed is geared up to the cutting capacity of the saws.

For cutting lumber into short lengths, as for box material, stationary saws are secured on the arbor at the proper points, and thus cut off, while the ends of the board are at the same time being trimmed.

To facilitate the removal and replacement of the saws on the arbor, the ends of the latter are journaled in an iron girt, $A^3$, at each end of the frame A, which girt is secured by one or more bolts at each side, so as to be easily removed when required.

What we claim as our invention, and desire to secure by Letters Patent, is—

1. The rock-shaft I, levers J, rocker-arms K, forked connecting-rods L, radius-links N, pulleys M M', guide-rods O, chains Q, and shaft P, the latter rotated in any convenient manner, and all operating substantially in the manner described, for carrying the lumber to and past the saws.

2. The arrangement with relation to the arbor B of the friction-gears or pulleys $k\ l\ n\ o\ q\ r$ and shafts $m$ and $p$ for rotating the shaft P, as shown and set forth.

CHANCY LAMB.
THOMAS J. FRAZIER.

Witnesses as to signature of C. LAMB:
    W. W. STEVENS,
    AMOS G. EWING.

Witnesses as to signature of T. J. FRAZIER:
    H. F. EBERTS,
    H. S. SPRAGUE.